April 4, 1967  J. A. BLAKE ET AL  3,312,894
SYSTEM FOR MEASURING A CHARACTERISTIC
OF AN ELECTRICAL PULSE
Filed Jan. 23, 1964  3 Sheets-Sheet 3

United States Patent Office 3,312,894
Patented Apr. 4, 1967

3,312,894
SYSTEM FOR MEASURING A CHARACTERISTIC OF AN ELECTRICAL PULSE
James A. Blake, St. Paul, and James C. Boyd, Minneapolis, Minn., assignors to International Business Machines Corporation, New York, N.Y., a corporation of New York
Filed Jan. 23, 1964, Ser. No. 339,661
11 Claims. (Cl. 324—68)

The present invention relates to electrical pulse time-measuring systems and, more particularly, to systems and arrangements for measuring the pulse width and thus pulse durtaion of electrical energy pulses.

It is often desirable to measure with high precision the width or time duration of electrical energy pulses. For example, various operational performance characteristics of an electrical energy translating system or device are frequently indicated by the amplitude, waveform, and width of electrical pulses created by or translated through the system or device. Peak pulse amplitude may usually be readily measured by simple available instrumentation, but measurements of the waveform and width of electrical energy pulses are often accomplished with more difficulty and heretofore most usually involved measurements made in relation to a visual oscillographic display of the pulse waveform. Accuracy of measurements made by means of oscillographic display involve certain well-known equipment limitations, and especially the matter of the oscilloscope vertical amplifier band width and inherent frequency-phase shifts.

A pulse sampling technique is occasionally employed to measure the rise or fall time (the time required to change between two preselected amplitude levels) of electrical pulse energy, and this technique may be extended to measure the time duration of an electrical pulse. This technique contemplates periodic and very brief amplitude sampling of successive pulses, the time of sampling being progressively delayed by equal time increments as between successive pulses. The progressive sample delay is controlled by uniform time increments provided by a time standard, usually a constant periodicity pulse generator often called a time clock, and the measure amplitude value of each pulse at the sampling moment is preserved or held essentially constant until it is increased or decreased by the next amplitude sample measurement. This procedure creates a stepped, slowed down replica of the changing amplitude of the pulse waveform. By initiating a count of the time-clock time increments when the pulse amplitude reaches a first preselected value and halting the count at a second preselected pulse amplitude value, a measurement of the time interval elapsing between these preselected amplitude levels is provided. Duplication and rearrangement of the counting equipments enables measurement of the time interval elapsing between preselected amplitude levels on the leading and lagging edges of the pulse waveform and thus the pulse width or pulse duration. The equipment required for this measurement technique is both complex and expensive and by reason of its complexity is subject to a certain amount of operational instability and thus inaccuracy of measurement.

It is an object of the present invention to provide a novel electrical pulse measuring system which avoids one or more of the disadvantages and limitations of prior such systems.

It is a further object of the invention to provide an improved electrical pulse measuring system of the servo-feedback type, and one wherein accurate sampling measurements depicting one or more desired pulse-energy characteristics may be readily accomplished with high accuracy and within exceptionally short overall pulse durations of the order of $\frac{1}{10}$th nanosecond ($10^{-10}$ seconds) without the need for costly and complex wideband servo-loop amplifiers.

It is an additional object of the invention to provide an electrical pulse measuring system of relatively simple and reliable construction and one exhibiting high measurement stability and accuracy over prolonged operational periods.

It is yet a further object of the invention to provide an improved electrical pulse measuring system particularly suited for measurements of electrical energy pulses of very brief duration, and one providing measurements directly indicative of pulse width and indirectly indicative of pulse amplitude and waveform.

An electrical pulse measuring system according to the invention employs a closed-loop servo arrangement which is operationally responsive (1) to a measured energy level established by periodic sampling of the pulse amplitude and (2) to a measurement-reference energy level established by the algebraic difference in magnitude of the measured energy voltage level and a reference fixed voltage level. The servo-loop operates automatically to seek closed-loop operational stability at which the prevailing values of such voltage levels are equal. By selecting two unlike polarity reference voltage levels and permitting the servo arrangement to establish operational stability on first one and then the other, indications are furnished which enables measurement of the pulse width and thereby of the time duration of the measured pulse with respect preselected voltage amplitude levels thereof. The servo loop in particular provides energy storage of amplitude samples of the pulse taken periodically at a controllable sampling-time delay, compares the algebraic difference of the voltage amplitude value of such storage with a preselected value of fixed amplitude reference voltage, and periodically controls the magnitude of a further loop energy storage according to the magnitude and sense of any comparative difference which is found to prevail. The voltage amplitude of such further energy storage is then compared with a time-reference ramp voltage of triangular waveform to advance or retard the time of pulse amplitude sampling until operational loop stability is achieved by the prevailing comparative equality of the sampled-pulse storage energy voltage amplitude with the fixed reference voltage amplitude. The voltage amplitude difference of the further loop energy storage for the two operational stabilized conditions of the servo arrangement provides a direct time interval measurement.

Other objects and advantages of the invention will appear as the detailed description thereof proceeds in the light of the drawings forming a part of this application and in which.

Figure 1:
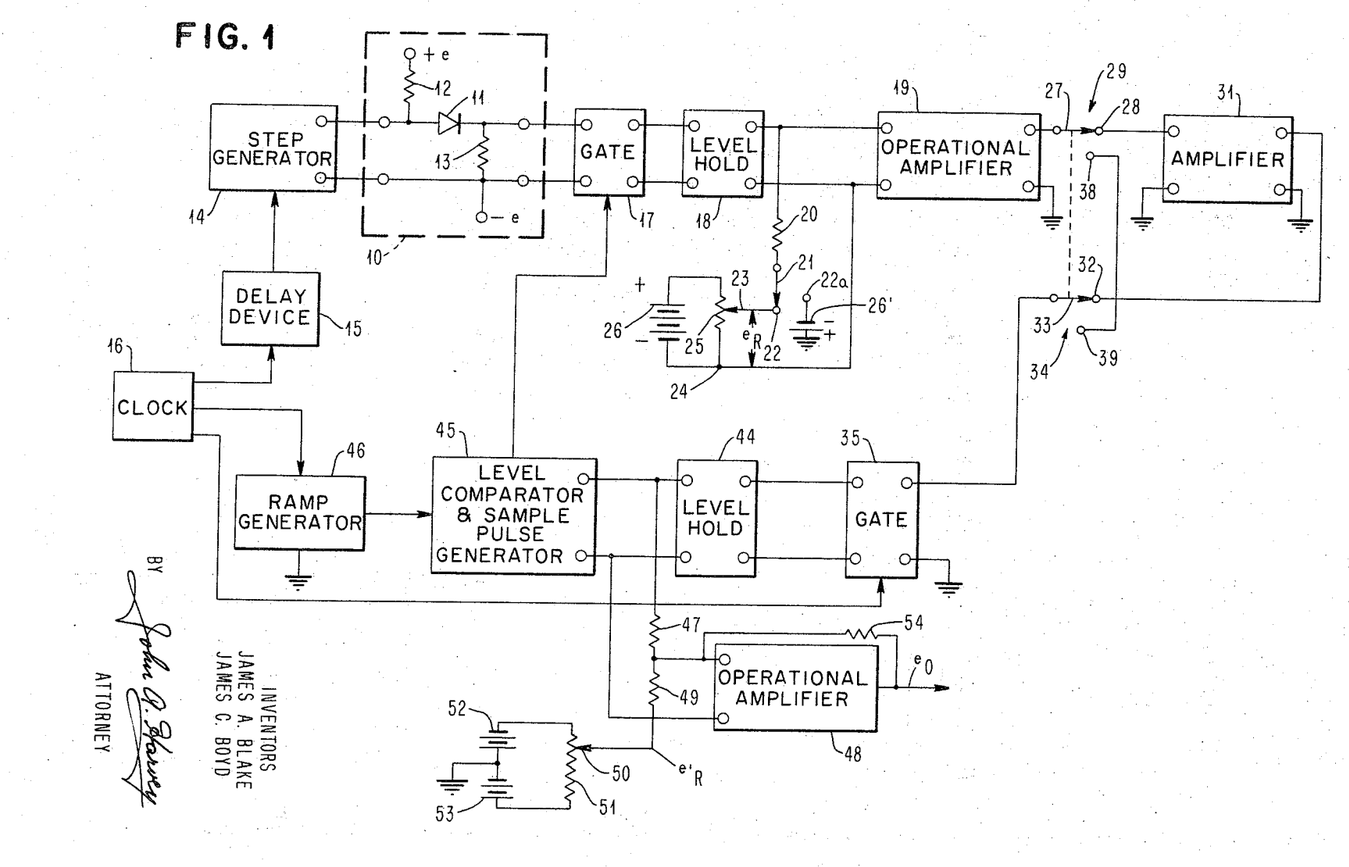
FIG. 1 represents in block diagram form a complete electrical pulse measuring system embodying the present invention.

Referring now more particularly to FIG. 1, the electrical pulse measuring system is here shown as embodying a form of the invention particularly suitable for measuring the width of electrical current or voltage pulses translated by a device 10 under test. In particular, the device under test is shown by way of example as comprising a solid state diode rectifier device 11 arranged for measurement of its reverse recovery time upon change from a conductive to a non-conductive state. The diode device 11 is normally maintained conductive by current supplied through a current limiting resistor 12 and a diode load resistor 13 from a source of unidirectional current indicated as $+e$ and $-e$. For purposes of measuring the recovery time of the diode device 11, the latter is periodically rendered non-conductive by the negative-going leading edge of a periodic step pulse potential supplied to the diode device 11 and its load resistor 13 in series from a step generator 14 controlled through a delay device 15 from a source of timing potential pulses indicated as a clock 16. The clock 16 is of conventional construction and provides a succession of relatively short duration potential pulses at a rate conveniently of the order of 100 kilocycles. The delay device 15, which translates these timing pulses to the step generator 14, is also of conventional construction and may conveniently be comprised either by a conventional form of distributed-constant or lumped-constant delay line or by a monostable multivibrator synchronized in operation by the timing pulses of the clock 16. The step generator 14 also is of conventional construction and, where the delay device 15 is a transmission line which simply translates the timing pulses of the clock 16, may conveniently be comprised simply by a conventional amplifier providing both amplification and correction for any waveform distortion introduced by the delay device 15.

The instantaneous value of current flowing through the diode rectifier device 11 produces a corresponding instantaneous value of voltage across the load resistor 13, and this voltage is applied to the input circuit of a gate unit 17 hereinafter more fully described. The gate unit 17 is so controlled in a manner presently to be explained as periodically to sample, during a relatively short sampling interval, the instantaneous amplitude of the voltage developed across the load resistor 13 and to translate to or from a level hold unit 18 electrical energy proportional to the prevailing change of amplitude of the sampled potential developed across the resistor 13. The level hold unit 18 has a construction described more fully hereinafter, and includes an electrical energy storage means conveniently comprised by a condenser connected across the input terminals of the unit 18 to have electrical energy translated to and from storage in this condenser by the gate unit 17.

The charge voltage developed across the condenser of unit 18 is supplied to the input circuit of an operational amplifier 19. There is concurrently supplied to the input circuit of the latter through an isolating resistor 20 either of two reference voltages. During normal measurement intervals, a switch 21 is operated to close its contact 22 to apply to the amplifier 19 a reference voltage $e_R$ appearing between the manually adjustable contact 23 and the lower terminal 24 of a potentiometer 25 energized by a potential source such as a battery 26. For purposes of ascertaining the reverse recovery time of the diode device 11 under test, the polarity of the voltage source 26 is positive and opposite to that of the charge potential developed in the output circuit of the level hold unit 18. During an initial measurement set-up interval hereinafter considered, the switch 21 is operated to close its contact 22a and apply to the amplifier 19 a small negative potential supplied by a battery 26'.

The output circuit of the operational amplifier 19 is coupled during the measurement set-up interval through a movable switch contact 27 and a fixed switch contact 28 of a switch 29 to the input circuit of a conventional phase-reversing unity-amplification-ratio amplifier 31 which has an output circuit coupled through a fixed contact 32 and a movable contact 33 of a switch 34 to the input circuit of a gate unit 35. Diode reverse recovery time measurements are made with the movable contact 27 of the switch 29 engaging a fixed contact 38 of this switch and with the movable contact 33 of the switch 34 engaging a fixed contact 39 of the latter whereby the output circuit of the operational amplifier 19 is coupled directly to the input circuit of the gate 35.

The operational amplifier 19 is of conventional construction, and provides an output circuit voltage varying 180 electrical degrees out of phase with changes of the input circuit voltage. It is a high-gain direct-current amplifier employing large degenerative feedback and having essentially constant input-circuit to output-circuit gain from zero frequency (direct current) to about 105 cycles per second. Typically such amplifiers exhibit an input circuit impedance greater than about $10^8$ ohms, have an open loop (zero degenerative feedback) voltage gain greater than 30,000 (90 db), provide an output circuit voltage of $\pm 50$ volts with an output current of $\pm 50$ milliamperes, for a 10 db output signal-to-noise ratio require an input signal current of $10^{-11}$ amperes at an input voltage of $10^{-3}$ volts, and have a "roll off" rate (gain vs. frequencies greater than about 5 cycles per second) of 20 db per decade to a zero db frequency of about $10^7$ cycles per second.

The gate 35 is described more fully hereinafter, and is controlled by timing pulses supplied thereto from the clock 16. In particular, each timing pulse causes the gate 35 to translate to and from a level hold unit 44 electrical energy developed in the output circuit of the one of the amplifiers 19 or 31 which is coupled to the input circuit of the gate 35. The level hold unit 44, described more fully hereinafter, likewise includes an electrical energy storage device such as an electrical condenser connected directly in shunt to the input terminals of this unit. The charge voltage developed across this storage condenser is supplied through a direct current amplifier included in unit 44 to a bias control input circuit of a level comparator and sample pulse generator unit 45 described more fully hereinafter. The latter has a second bias control circuit to which is applied a ramp voltage of repetitive triangular waveform generated by a ramp generator unit 46 hereinafter described more fully and which is synchronized in operation by timing pulses applied thereto from the clock 16. The unit 45 develops and applies to the gate 17, to control each period of translation conductivity of the latter, a short duration sampling pulse generated each time that the ramp voltage of the ramp generator 46 increases to a voltage level equal to the output voltage of the level hold unit 44. The significance of this will presently be explained more fully, but for the moment it may be noted that the input and output circuits of the operational amplifier 19 (or the input circuit of the amplifier 19 and output circuit of the amplifier 31 where these amplifiers are operated in series relation) are coupled by a servo loop which includes the gate unit 35, the energy-storage level hold unit 44, the sample pulse generator unit 45, the gate unit 17, and the energy-storage level hold unit 18. The system functions to seek a stable loop operational condition in a manner which will presently be explained.

The output-circuit potential of the level hold unit 44 is applied through a series resistor 47 to the input circuit of an operational amplifier 48, and there is concurrently applied to the input circuit of the latter through a series resistor 49 a reference potential $e'_R$ developed at the movable contact 50 of a potentiometer 51 energized by a suitable source of unidirectional voltage such as batteries 52 and 53 having a midvoltage point connected to ground as shown. The output voltage $e_0$ of the amplifier 48 indicates the results of measurements made by the system, and a conventional degenerative D.C. feedback resistor 54 controls the gain of the amplifier 48 and thus may have a value selected to provide a desired scaling factor for the indicated measurements.

In considering the operation of the electrical pulse measuring system just described, assume that for purposes of an initial set-up measurement the switch 29 is operated to close its contacts 27 and 28 and that the switch 34 is operated to close its contacts 32 and 33 for operation of the amplifiers 19 and 31 in series relation. Assume further that the switch contact 21 is operated to close its contact 22a and thus supply a small value of negative voltage from the battery 26' to the input circuit of the operational amplifier 19.

Figure 2:
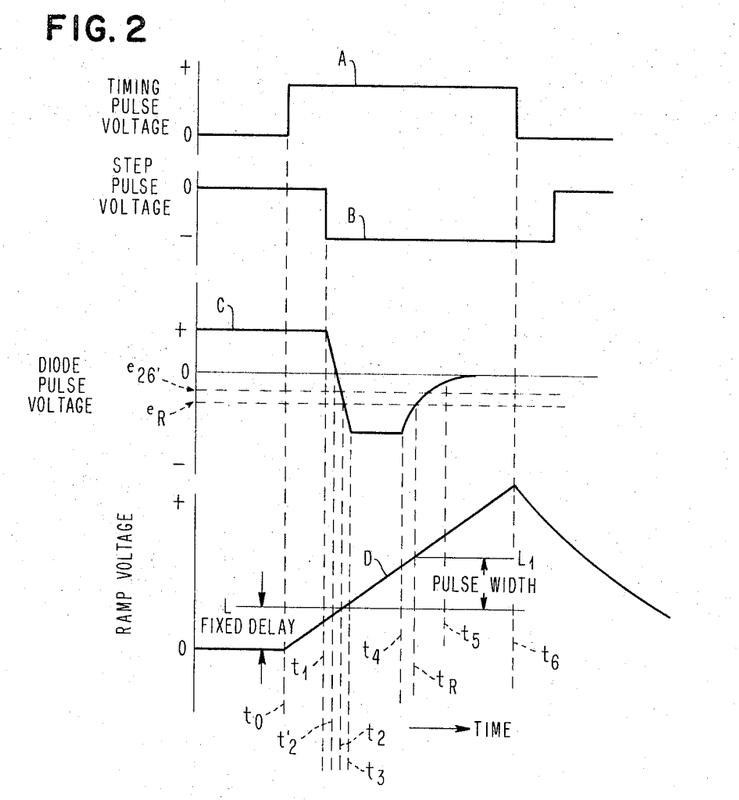
FIG. 2 graphically represents certain voltage relationships in the FIG. 1 system, and is used as an aid in explaining the system operation.

Referring now to FIG. 2, the clock 16 develops a succession of output timing pulses as represented by curve A of which each such pulse is initiated at time $t_0$ in an individual clock cycle and has a pulse duration $t_0$–$t_6$. These timing pulses are translated through the delay device 15 to provide a convenient value of initial delay ensuring system operation on a linear portion of the ramp voltage waveform presently to be considered, and each such pulse initiates at time $t_1$ the generation by the step generator 14 of a step voltage pulse represented by curve B. Throughout the interval prior to time $t_0$ and continuing to time $t_1$, positive current flows through the diode device 11 under test to develop across the load resistor 13 a positive value of voltage as represented by the initial portion of curve C. The negative going leading edge of the step pulse generated by the step generator 14 reverse biases the diode device 11 to initiate the termination of positive current flow therethrough. By reason of the inherent conductive characteristics of the diode device 11, the applied step voltage not only terminates the positive current flow through this device but in fact causes a reverse or negative current flow which is shown as theoretically reaching a maximum value at time $t_3$ and persisting at this maximum value to time $t_4$ after which the reverse current decays to zero value as indicated by the curved terminal portion of curve C. This curve thus represents the diode reverse recovery time characteristic to be measured.

The diode current in flowing through the load resistor 13 develops across the latter a voltage pulse having the waveform represented also by curve C. This voltage pulse is applied to the gate 17 which becomes conductive during the interval of each sampling pulse generated by the pulse generator unit 45 whenever the ramp voltage, represented by curve D initiated at time $t_0$ by a timing pulse applied to the ramp generator 46, equals the voltage applied from the level hold unit 44 to the pulse generator 45. Each conductive interval of the gate unit 17 causes the then prevailing instantaneous values of diode pulse voltage to add to or subtract from any electrical energy previously stored in the storage condenser of the level hold unit 18, the resultant storage condenser voltage remaining constant or "holding" to the next conductive interval of the gate unit 17.

At the outset of a system measurement operation, it may be assumed that the level hold unit 18 stores no electrical energy and accordingly applied no voltage to the input circuit of the operational amplifier 19. Thus only the small negative voltage of the battery 26' is applied at this time to the input circuit of the amplifier 19 to control the correspondingly reduced value of voltage applied by the amplifier 31 to the gate 35. The latter is rendered conductive during each timing pulse of the clock 16, and each time effects an increase or decrease of the charge previously stored in the electrical energy storage condenser of the level hold unit 44. The value of charge voltage which prevails at this time in the level hold unit 44 is determined by the value of the voltage applied from the battery 26' to the input circuit of the amplifier 19. Assume that this voltage as applied to the bias circuit of the sample pulse generator 45 causes the latter to develop a sample pulse at a time $t_2$ when the ramp voltage represented by curve D. has relatively small amplitude. The gate 17 under this assumed condition is rendered conductive at a time when a negative value of pulse voltage is developed across the diode load resistor 13. A negative charge is thus transferred to storage in the energy storage condenser of the level hold unit 18, and the resultant negative charge voltage is applied thereafter to the input circuit of the amplifier 19 where it adds to the negative voltage of the battery 26'. This applied negative voltage is reversed in polarity by the amplifier 19 and is again reversed in polarity by the amplifier 31 further to reduce the output voltage of the latter unit. Thus when the next timing pulse renders the gate 35 conductive, the reduced potential applied to the input circuit of the gate 35 causes a decrease of the energy stored in the storage condenser of the level hold unit 44. A reduced charge voltage is thereafter applied to the bias circuit of the sample pulse generator 45 so that the next sample pulse is generated at a lower amplitude level of the ramp voltage. It will be evident that the generation of this sample pulse occurs with a lesser time delay after the time $t_0$. Assume that this sample pulse is generated at time $t'_2$ when the diode pulse voltage has an instantaneous positive polarity.

This sample pulse in rendering the gate 17 conductive transfers a positive charge to the energy storage condenser of the level hold unit 18, and the resultant positive increase of charge voltage is thereafter applied to the input circuit of the amplifier 19. Assume by way of example that the amplitude of the positive diode pulse voltage at the sampling time $t'_2$ is larger than the negative voltage of the battery 26' (shown as the voltage $e_{26'}$ in relation to curve C of FIG. 2). A resultant net positive voltage is now applied to the input circuit of the amplifier 19. When during the succeeding timing pulse the resultant increase in the positive direction of the output voltage of the amplifier 31 is translated by the gate unit 35 to the level hold unit 44, the charge energy of the storage condenser in this unit increases in the positive direction. The bias voltage applied from the unit 44 to the sample pulse generator 45 likewise increases in the positive direction, so that the succeeding sample pulse generated by the unit 45 is generated when the ramp voltage reaches a correspondingly higher amplitude and thus is generated with somewhat more delay from the time $t_0$ than that of the previous sampling pulse.

As successive sampling pulses are thus generated with increasing and decreasing time delays according to the net value and polarity of the voltage applied to the input circuit of the amplifier 19, sampling pulses are eventually generated with a delay such that the amplitude of the sampled diode pulse voltage has a positive value just equal to the negative voltage value of the battery 26'. The resultant output charge voltage of the level hold unit 18 will then just cancel the voltage of the battery 26' and a net zero value of voltage will be applied to the input circuit of the amplifier 31. The energy storage of the level hold unit 44 will, under this operational condition, then not change when the gate unit 35 is rendered conductive and the generated sample pulses are then generated by the generator 45 with a constant value of delay from the time $t_0$. The repeated sampling of the diode pulse voltage by these sampling pulses of constant delay maintains constant the output charge voltage of the level hold unit 18.

The measuring system accordingly operates automatically to seek a stabilized condition at which the value of delay of the generated sampling pulses with respect the time $t_0$ in each of the repetitive operating cycles is such that the sampled amplitude of the diode pulse voltage is just equal to the voltage of the battery 26' but is of opposite polarity to the battery voltage. That this is true will be evident when it is considered that any net positive value of voltage applied to the input of the amplifier 19 will result in a continuing increase in the positive direction of the charge storage of the level hold unit 44 with resultant continuing increase in the delay time with which successive sample pulses are generated; conversely, a net negative value of voltage applied to the input circuit of the amplifier 19 will have the opposite effect of continuously decreasing in the negative direction the charge storage of the level hold unit 44 with resultant continuing decrease in the delay time with which successive sample pulses are generated. To insure that this stabilized system condition will always be attained, it is only necessary that the voltage of the battery 26′ have some small negative value even during the extreme zero-value trailing edge of the diode pulse voltage so that any sampling of the latter with long sampling delay times (however occasioned) results in a decrease of the sampling pulse delay.

Since the amplitude of the ramp voltage generated by the generator 46 varies substantially linearly with time, the constant-valued delay between the time $t_0$ when each timing pulse is initiated and the time of generation of each constant-delay sampling pulse of the pulse generator 45 provides for this stabilized system condition a reference time from which to start a measurement of the reverse recovery time of the diode device 11. This may be considered an initial measurement reference time, and is represented by a constant-valued output voltage level of the level hold unit 44 since it is this voltage level which corresponds to the level L of the ramp voltage (curve D) that establishes the fixed delay from time $t_0$ at which the constant-delay sample pulses are generated by the pulse pulse generator 45. Further, the ramp voltage level L the constant delay interval $t_0$–$t_2$ established by the delay represents a fixed value of delay since it is occasioned by device 15 and step generator 14. Accordingly, the output voltage of the level hold unit 44 may be applied to the operational amplifier 48 and the adjustable contact 50 of the potentiometer 51 may then be so adjusted that the output voltage $e_0$ has a preselected value (such as zero value) from which to base measurements of the diode recovery time by measurement of the width of the diode voltage pulses in a manner now to be explained.

Having thus established the initial operational time from which to measure the diode recovery time interval, the switch 29 is operated to close its contacts 27 and 38 and the switch 34 is operated to close its contacts 33 and 39. This removes the amplifier 31 from the system, and the output voltage of the operational amplifier 19 is now supplied directly to the input circuit of the gate unit 35. The switch contact 21 is now closed to the switch contact 22 and the adjustable contact 23 of the potentiometer 25 is adjusted to select a value of reference voltage $e_R$ corresponding to the diode pulse voltage level defining the diode reverse recovery time interval to be measured. The reference voltage $e_R$ is indicated (with reversed polarity) in relation to the diode pulse voltage represented by curve C of FIG. 2. The polarities of the reference voltage $e_R$ and the prevailing output charge voltage of the level hold unit 18 are both reversed by the operational amplifier 19. Thus a net negative voltage applied to the input circuit of the amplifier 19 is translated through the gate 35 to effect an increase in the positive direction of the charge voltage of the energy storage condenser of the level hold unit 44, and a net positive voltage applied to the input circuit of the amplifier 19 results in a decrease or change in the negative direction of the charge of the energy storage condenser of the level hold unit 44. The magnitude of the reference voltage $e_R$ is shown by way of example in FIG. 2 as selected to correspond to the half-amplitude level on the trailing edge of the diode pulse voltage. Thus the instantaneous amplitude of the diode pulse voltage will equal the reference voltage $e_R$ at a time $t_R$ following the initiation $t_0$ of each timing pulse.

From the foregoing description of the system operation, it will be evident that generation of the sampling pulses by the generator 45 with a relatively long time delay such as a delay $t_0$–$t_5$ will result in the storage by the level hold unit 18 of a negative charge voltage smaller in magnitude than the reference voltage $e_R$. The net difference between the latter mentioned voltages is a positive voltage, which is reversed in polarity by the amplifier 19 and is translated through the gate 35 during each timing pulse to produce a decrease in the charge voltage of the energy storage condenser of the level hold unit 44 (i.e. to reduce the magnitude of previously stored energy in the latter unit). This results in a decrease of the delay with which the next sampling pulse is generated by the generator 45. Further decreases of sampling pulse delay will occur with each increment of charge voltage translated during a timing pulse by the gate 35 to the level hold unit 44 until a stabilized delay interval $t_0$–$t_R$ is established when the charge potential of the level hold unit 18 is equal in magnitude but opposite in polarity to the reference voltage $e_R$. Should the initial delay time of the sampling pulses of the generator 45 be so short that sampling of the diode pulse voltage occurs in the interval between times $t_3$ and $t_R$, it will be evident that the net voltage applied to the input circuit of the amplifier 19 will have negative polarity with the result that the charge energy of the level hold unit 44 increases in the positive polarity direction to increase the delay with which the sample pulses are generated by the generator 45 following initiation at time $t_0$ of each timing pulse. This delay increase will continue until the delay has the value $t_0$–$t_R$ when the sampled amplitude of the diode pulse voltage is equal in magnitude but opposite in polarity to the reference voltage $e_R$ at which time the system again stabilizes.

The level hold unit 44 is so constructed, as will hereinafter be described more fully, that it establishes a minimum sample pulse delay of approximate value $t_0$–$t_3$ corresponding to at least a small net negative value of voltage applied to the input circuit of the amplifier 19. Thus all sampled values of the diode pulse voltage establish a stabilized system condition such that the net voltage applied to the input circuit of the amplifier 19 has substantially zero value.

The voltage developed in the output circuit of the level hold unit 44 for the stabilized condition of the system last mentioned has two components. One is comprised by the earlier described voltage corresponding to the amplitude level L, curve D, of the ramp voltage of the unit 46 at which the system stabilizes on a leading edge amplitude level of the diode pulse voltage during the initial measurement set-up conditions first described. As earlier explained, this voltage component has fixed value since it is established by the delay of the delay device 15 and step generator 14. This fixed value voltage component is taken into account in selecting the initial bias $e'_R$ applied to the operational amplifier 48 to establish a preselected initial value of its output voltage $e_0$. The second component of the level hold output voltage is comprised by the difference between the ramp voltage level L and the ramp voltage level $L_1$ at which the system stabilizes on that amplitude of the diode pulse voltage which is equal to the reference voltage $e_R$. This second voltage component causes an increase of the output voltage $e_0$ of the operational amplifier 48. Since the ramp voltage (curve D) varies linearly with time, this increase of output voltage $e_0$ is a measure of the diode voltage pulse width by reason of the fact that it is directly proportional to the ramp voltage level difference L–$L_1$. Thus the system operates to measure the diode reverse recovery time by measure of the diode pulse voltage width between preselected pulse voltage levels, of which one level may be selected at will by selection of the value of the reference voltage $e_R$ applied to the input circuit of the operational amplifier 19. By making successive such measurements with differing values of the reference voltage $e_R$, a plot of the diode pulse voltage waveform (and thus a plot of the diode reverse recovery time waveform) may readily be made on the approximate assumption that the leading edge of the diode pulse voltage waveform is infinitely steep.

Figures 3, 4:
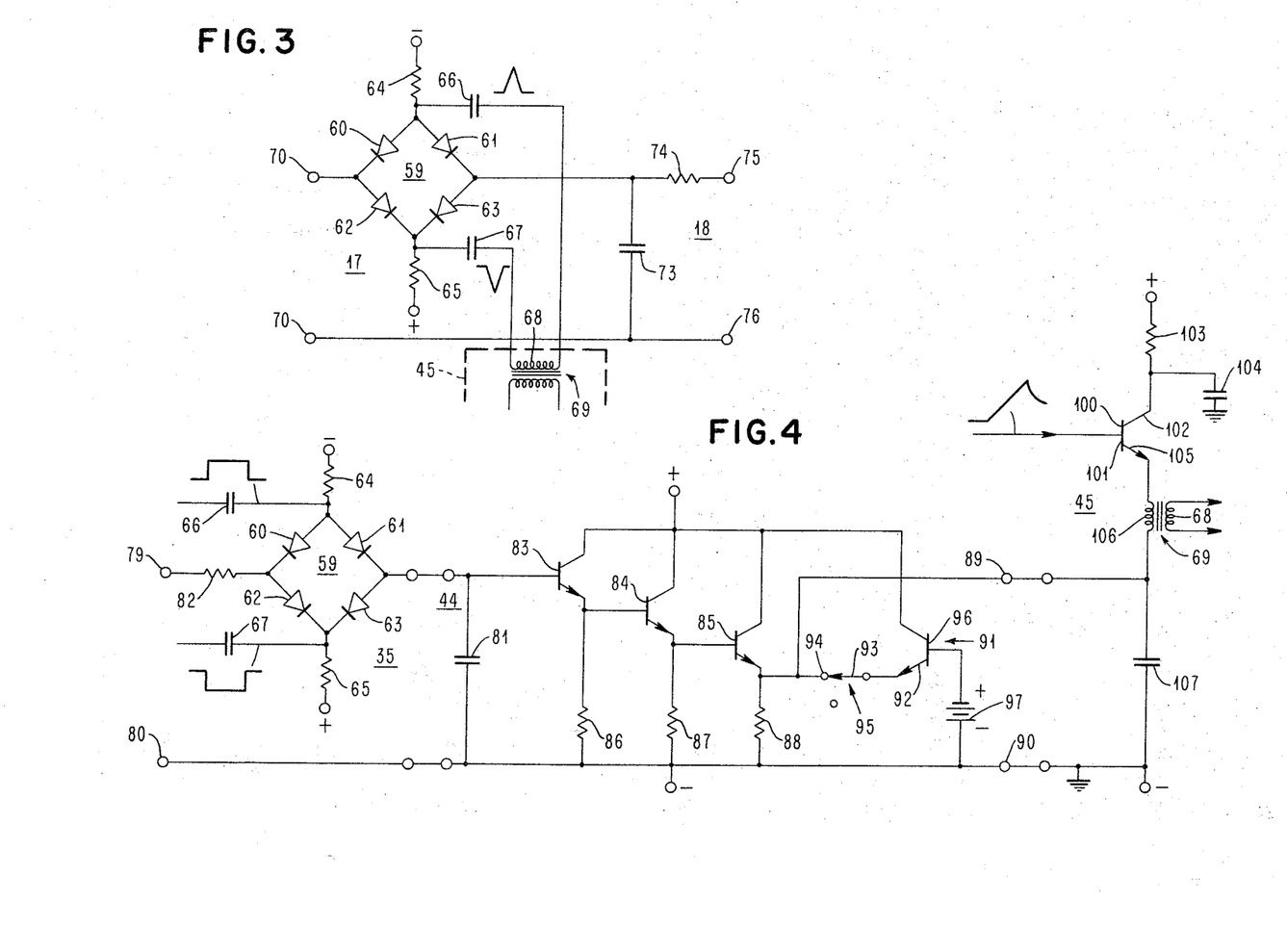
FIG. 3 represents a circuit diagram of a gate unit and a level hold unit used in the FIG. 1 system.
FIG. 4 is a circuit diagram of a modified form of gate unit, a level hold unit, and a level comparator and sample pulse generator unit used in the FIG. 1 system.

The circuit arrangement of the gate unit 17 and level hold unit 18 of the FIG. 1 system is shown in FIG. 3. The gate unit 17 is comprised by a diode rectifier bridge 59 including diode rectifier devices 60–63 arranged as shown and normally biased to be non-conductive by a bias voltage supplied to diametrically opposed points of the bridge through series resistors 64 and 65. The diode rectifier devices 60–63 are rendered conductive, however, by each sample pulse voltage applied through series condensers 66 and 67 from the secondary winding 68 of a pulse output transformer 69 included in the sample pulse generator 45 presently to be described. The diode pulse voltage is applied to the input terminals 70 of the gate 17. During the conductive states of the diode rectifier devices 60–63 under control of the sample pulse voltage, the gate 17 is effective to translate the diode pulse voltage to charge or discharge a condenser 73 included in the level hold unit 18. The charge voltage of the condenser 73 is supplied through a series resistor 74 and the output terminals 75 and 76 of unit 18 to the operational amplifier 19 of the FIG. 1 system. The charge and discharge time constants of the condenser 73 are relatively short, being principally established by the small value of this condenser together with the conductive impedance of the diode devices 60–63 and the elements 11–13 of the unit 10 under test, so that the condenser charges relatively quickly to either polarity of charge voltage (or changes the magnitude of a charge previously stored) by energy supplied to and from the condenser through the gate 17 under control of the diode pulse voltage applied to the input terminals 70 of the latter unit. The non-conductive impedance of the diode devices 60–63 and the resistance of the resistor 74 are sufficiently large that the charge voltage of the condenser 73 remains essentially constant during the interval between successive sample pulses.

The circuit arrangement of the gate unit 35, the level hold unit 44, and the level comparator and sample pulse generator unit 45 of the FIG. 1 system are shown in FIG. 4.

The gate unit 35 shown in FIG. 4 is essentially similar to the gate unit 17 just described, and corresponding components of these two gate units are identified by similar reference numerals. The operation of the gate unit 35 likewise is similar to that of the gate unit 17 except that the periods of conductivity of the diode rectifier devices 60–63 of the gate unit 35 are controlled by timing pulses supplied through the condensers 66 and 67 from the clock 16 of the FIG. 1 system. The output voltage of the operational amplifier 19, or that of the amplifier 31, of the FIG. 1 system is applied to the input terminals 79 and 80 of the gate 35 and during conductive periods of the diode rectifier devices 60–63 increases or decreases the charges of a condenser 81 of the level hold unit 44 through a series resistor 82 connected between the input terminal 79 of the gate 35 and the diode rectifier bridge 59 as shown. The charging and the discharging time contants of the level hold condenser 81 are established by the relatively large capacitive value of the latter and the large value of the resistor 82 through which energy is supplied to and abstracted from the condenser 81 from the output circuit of the operational amplifier 19 (or amplifier 31) during conductive periods of the diode rectifier devices 60–63. These time constants are preferably much larger than the charging and discharging time constants associated with the storage condenser 73 of the level hold 18 (FIG. 3). Thus the latter may respond relatively rapidly to changes of the sampled amplitude of the diode pulse voltage, whereas the level hold unit 44 with its slower response to changes of output voltage of the amplifier 19 (or amplifier 31) reduces the rapidity with which the measuring system approaches a stabilized operational condition and thus minimizes any tendency of the system to reach the stabilized condition by a "hunting" (i.e. decaying oscillatory) character of stability search operation.

The level hold unit 44 shown in FIG. 4 also includes a conventional three-stage direct-current emitter-follower amplifier including transistors 83, 84 and 85 having emitter load resistors 86, 87 and 88, respectively, connected and arranged as shown. The charge voltage developed across the condenser 81 is thus translated by the direct current amplifier to the emitter load resistor 88 of the transistor 85 for application to the output terminals 89 and 90 of the level hold unit 44. To prevent the output voltage of the level hold unit 44 from decreasing during pulse-width measurements below a preselected minimum value slightly larger than the reference voltage $e_R$, a transistor 91 has an emitter electrode 92 connected during pulse-width measurements through the movable contact 93 and a fixed contact 94 of a switch 95 to the emitter load resistor 88 of the transistor 85. The base electrode 96 of the transistor 91 is biased by a positive potential supplied by a battery 97 having a value corresponding to the minimum value of output voltage desired of the level hold unit 44. The contacts 93 and 94 of the switch 95 are opened during the initial set-up measurement earlier described since the output voltage of the level hold unit 44 should have no minimum value at this time. The non-conductive impedance of the gate 59 and the input base electrode impedance of the transistor 83 are sufficiently high that the charge voltage of the condenser 81 remains essentially constant during the interval between successive timing pulses supplied to the gate 35.

The level comparator and sample pulse generator unit 45 shown in FIG. 4 includes an avalanche transistor 100, such as a General Electric type C11B silicon controlled rectifier, having a conductance-control electrode 101 to which the ramp voltage of the ramp generator 46 of FIG. 1 is applied. The transistor has a collector electrode 102 energized through a resistor 103 of relatively large value from the positive terminal of an energizing source as indicated, and is connected through a condenser 104 to ground potential as shown. The emitter electrode 105 of the transistor 100 is connected through the primary winding 106 of the pulse transformer 69 earlier mentioned in connection with FIG. 3, and is further connected to the negative grounded potential of the transistor energizing source through a condenser 107 across which is coupled the output circuit of the level hold unit 44. The operation of the level comparator and sample pulse generator unit 45 is responsive to the instantaneous voltage difference between the ramp voltage applied to the conductance-control electrode 101 and the level-hold voltage applied to the emitter electrode 105 of the transistor 100. When the ramp voltage slightly exceeds the value to the voltage applied by the level hold unit 44 to the emitter electrode 105, the transistor 100 rapidly becomes fully conductive by an avalanche character of operation quickly to discharge the condenser 104 which was charged during the previous non-conductive interval of the transistor 100 through the resistor 103 from the positive potential terminal of the energizing source. The rapidly increasing current discharge of the condenser 104 by the avalanche operational conductive state of the transistor 100 flows through the primary winding 106 of the pulse transformer 69 to develop in the secondary winding 68 of the latter a sample voltage pulse of brief duration. The condenser 107 provides a path of low impedance for this current pulse, which terminates when the transistor 100 has fully discharged the condenser 104 and becomes again non-conductive by a reverse emitter-collector voltage developed by the reactive inductance of the transformer primary winding 106. The unit 45 is then conditioned to generate a subsequent sample voltage pulse during the succeeding cycle of the ramp voltage when the amplitude of the latter once more equals the output voltage of the level hold unit 44.

Figure 5:
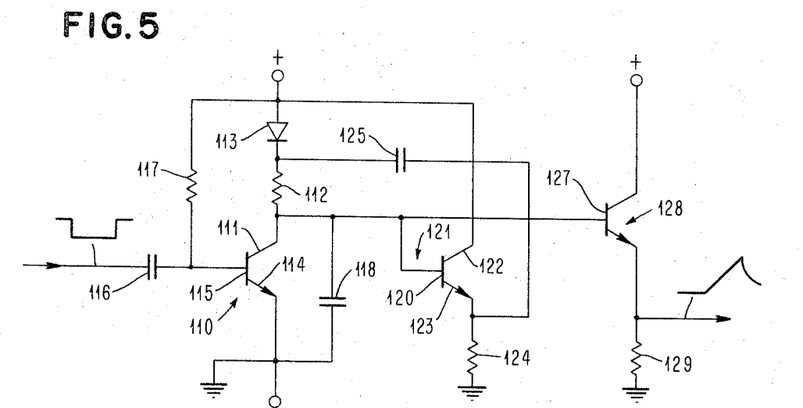
FIG. 5 is a circuit diagram of a ramp generator used in the FIG. 1 system.

The circuit arrangement of the ramp generator 46 of the FIG. 1 system is shown in FIG. 5 and will be recognized as one of the conventional "boot strap" circuit configuration. It includes a transistor 110 having a collector electrode 111 energized through a resistor 112 and a diode rectifier device 113 from the positive terminal of an energizing source. The emitter electrode 114 of the transistor 110 is connected directly to the negative terminal of the energizing source, and the base electrode 115 of this transistor is coupled through a condenser 116 to receive negative-polarity timing pulses supplied by the clock 16 of the FIG. 1 system. The transistor 110 is normally rendered conductive by a bias voltage applied to its base electrode 115 through a resistor 117 connected to the positive terminal of the energizing source. A condenser 118 is connected directly across the collector electrode 111 and the emitter electrode 114 of the transistor 110. Each timing pulse applied to the base electrode 115 of the transistor 110 renders the transistor non-conductive, and the condenser 118 thereupon begins to charge through the resistor 112 and the diode rectifier device 113 from the positive terminal of the energizing source. The charge voltage of the condenser is applied to the base electrode 120 of a transistor 121 having a collector electrode 122 energized directly from the positive energizing source and having an emitter electrode 123 coupled through an emitter load resistor 124 to the negative terminal of the energizing source but also coupled through a condenser 125 to the junction of the resistor 112 and diode rectifier device 113. As the condenser 117 begins to charge during the non-conductive interval of the transistor 110, the condenser terminal voltage is applied to the base electrode 120 of the transistor 121 to increase the potential drop developed across the emitter load resistor 124. This increase of potential is coupled through the condenser 125 to increase the voltage at the upper terminal of the resistor 112, whereby a larger voltage is available to charge the condenser 118. The resultant operation is such that the condenser 118 tends to develop a terminal charge voltage which increases linearly with time during the interval when the transistor 110 is rendered non-conductive by a timing pulse. At the termination of the timing pulse, however, the transistor 110 again becomes conductive quickly to discharge the condenser 118. The resultant ramp voltage developed across the condenser 118 is applied to the base electrode 127 of a transistor 128 to develop across an emitter load resistor 129 of the latter a ramp voltage corresponding to that of the condenser 118 and which is applied to the level comparator and sample pulse generator unit 45 earlier described in connection with FIG. 4.

It will be apparent from the foregoing description of the invention that an electrical pulse measuring system embodying the invention is one of the servo-feedback type wherein accurate pulse width measurements may be readily accomplished with high accuracy even within exceptionally short overall pulse durations of the order of $\frac{1}{10}$th nanosecond. The pulse measuring system of the invention dispenses with the need for costly and complex wide band servo-loop amplifiers, possesses a relatively simple and reliable construction, and is one exhibiting high measurement stability and accuracy over prolonged operational periods.

While a specific form of the invention has been described for purposes of illustration, it is contemplated that possible changes may be made without departing from the spirit of the invention.

What is claimed is:

1. An electrical pulse measuring system comprising: timing means; an operational amplifier having input and output circuits coupled by a servo loop including first electrical energy storage means and energy amplitude reference means both coupled to said input circuit, second electrical energy storage means, first translating means for translating electrical energy to and from said first energy storage means, and second translating means controlled by said timing means and coupling said output circuit to said second energy storage means for translating amplifier output-circuit energy to and from said second energy storage means; means coupled to and controlled by said timing means for supplying to said first translating means electrical pulse energy to be measured; means controlled by said timing means for supplying a time reference signal; and means included in said servo loop and controlled jointly by said time reference signal and by the energy storage in said second energy storage means for controlling said first translating means to effect, by time selectable translation of energy from said supply means to said first energy storage means and in relation to the energy amplitude of said reference means, measurement of a characteristic of said supplied electrical pulse energy.

2. An electrical pulse measuring system comprising: timing means for supplying timing electrical pulses of preselected pulse duration and periodicity; an operational amplifier having input and output circuits coupled by a servo loop including first electrical energy storage means and energy amplitude reference means both coupled to said input circuit, second electrical energy storage means, first translating means for translating electrical energy to and from said first energy storage means, and second translating means controlled by said timing means and coupling said output circuit to said second energy storage means for translating during at least a portion of each timing pulse of said timing means energy of said amplifier output circuit to and from said second energy storage means; means responsive to each timing pulse of said timing means for supplying to said first translating means electrical pulse energy to be measured; means coupled to said timing means and controlled by each timing pulse thereof for supplying a time reference signal having a characteristic varying substantially linearly with time during each timing pulse; and means included in said servo loop and controlled jointly by the instantaneous amplitude of said time reference signal and by the energy stored in said second energy storage means for pulse-time controlling said first translating means to effect, by time selectable translation of energy from said supply means to said first energy storage means and in relation to the energy amplitude of said reference means, measurement of a characteristic of said supplied electrical pulse energy.

3. An electrical pulse measuring system comprising: timing means for supplying timing electrical pulses of preselected pulse duration and periodicity; an operational amplifier having input and output circuits coupled by a servo loop including first electrical energy storage means and energy amplitude reference means both coupled to said input circuit, second electrical energy storage means, first sample-pulse-controlled translating means for translating electrical pulse energy to and from said first energy storage means, and second translating means controlled by said timing means and coupling said output circuit to said second energy storage means for translating during at least a portion of each timing pulse of said timing means energy of said amplifier output circuit to and from said second energy storage means; delay means coupled to said timing means to translate delayed timing pulses; means responsive to each delayed timing pulse translated by said delay means for supplying to said first translating means electrical pulse energy to be measured; means controlled by said timing means for supplying a time reference signal; and means included in said servo loop and controlled jointly by said time reference signal and by the energy stored in said second energy storage means for generating and supplying sample pulses to control said first translating means and effect, by time selectable translation of energy from said supply means to said first energy storage means and in relation to the energy amplitude of said reference means, measurement of a characteristic of said supplied electrical pulse energy.

4. An electrical pulse measuring system comprising: timing means for supplying timing electrical pulses of preselected pulse duration and periodicity; an operational amplifier having input and output circuits coupled by a servo loop including first electrical energy storage means and energy amplitude reference means both coupled to said input circuit, second electrical energy storage means, first translating means for translating electrical energy to and from said first energy storage means, and second translating means controlled by said timing means and coupling said output circuit to said second energy storage means for translating during at least a portion of each timing pulse of said timing means energy of said amplifier output circuit to and from said second energy storage means; delay means coupled to said timing means to translate delayed timing pulses; means responsive to each delayed timing pulse translated by said delay means for supplying to said first translating means electrical pulse energy to be measured; means controlled by said timing means for supplying a time reference signal having a characteristic varying substantially linearly with time during each timing pulse; and means included in said servo loop and controlled jointly by said time reference signal and by the energy storage of said second energy storage means for controlling said first translating means to effect, by time-delay controlled translation of energy from said supply means to said first energy storage means and in relation to the energy amplitude of said reference means, measurement of a characteristic of said supplied electrical pulse energy.

5. An electrical pulse measuring system comprising: timing means for supplying timing electrical pulses of preselected pulse duration and periodicity; an operational amplifier having input and output circuits coupled by a servo loop including first electrical energy storage means and energy amplitude reference means both coupled to said input circuit, second electrical energy storage means, first potential controllable translating means for translating electrical energy to and from said first energy storage means, and second translating means controlled by said timing means and coupling said output circuit to said second energy storage means for translating during at least a portion of each timing pulse of said timing means energy of said amplifier output circuit to and from said second energy storage means; means coupled to said timing means and controlled by each timing pulse thereof for supplying to said first translating means electrical pulse energy to be measured; means controlled by said timing means for supplying a time reference signal; and means included in said servo loop and controlled jointly by said time reference signal and by the energy stored in said second energy storage means for generating and supplying to said first translating means for control of the translation intervals thereof a sampling potential of periodic-pulse waveform having pulse durations short in relation to those of said timing pulses to effect, by time selectable translation of energy from said supply means to said first energy storage means and in relation to the energy amplitude of said reference means, measurement of a characteristic of said supplied electrical pulse energy.

6. An electrical pulse measuring system comprising: timing means; a direct-current operational amplifier having input and output circuits coupled by a servo loop including first electrical capacitance energy-storage means and unidirectional energy amplitude reference means both coupled to said input circuit, second electrical capacitance energy-storage means, first translating means for translating electrical energy to and from said first energy-storage means, and second translating means controlled by said timing means and coupling said output circuit to said second energy storage means for translating amplifier output circuit energy to and from said second energy-storage means; means controlled by said timing means for supplying to said first translating means electrical pulse energy to be measured; means coupled to said timing means and controlled by each timing pulse thereof for supplying a time reference potential signal; and means included in said servo loop and controlled jointly by the potential of said time reference signal and by the energy storage potential of said second energy-storage means for periodically controlling said first translating means at a period established by said timing means to effect, by time selectable translation of energy from said supply means to said first energy storage means and in relation to the energy amplitude of said reference means, measurement of a characteristic of said supplied electrical pulse energy.

7. An electrical pulse measuring system comprising: timing means for suplying timing electrical pulses of preselected pulse duration and periodicity; a direct-current operational amplifier having input and output circuits coupled by a servo loop including first electrical-capacitance energy-storage means and unidirectional energy amplitude reference means both coupled to said input circuit, second electrical-capacitance energy-storage means, first translating means for translating electrical energy to and from said first energy-storage means, and second translating means controlled by said timing means and coupling said output circuit to said second energy storage means for translating during at least a portion of each timing pulse of said timing means energy of said amplifier output circuit to and from said second energy-storage means; means responsive to each timing pulse of said timing means for supplying to said first translating means electrical pulse energy to be measured; means coupled to said timing means and controlled by each timing pulse thereof for supplying a time reference potential signal having an amplitude varying substantially linearly with time during each timing pulse; and means included in said servo loop and controlled jointly by the instantaneous amplitude of the potential of said time reference signal and by the energy storage potential of said second energy-storage means for periodically controlling said first translating means at a period established by said timing means to effect, by time selectable translation of energy from said supply means to said first energy storage means and in relation to the energy amplitude of said reference means, measurement of a characteristic of said supplied electrical pulse energy.

8. An electrical pulse measuring system comprising: timing means for supplying timing electrical pulses of preselected pulse duration and periodicity; a direct-current operational amplifier having input and output circuits coupled by a servo loop including first electrical-capacitance energy-storage means and unidirectional energy amplitude reference means both coupled to said input circuit, second electrical-capacitance energy-storage means, first translating means for translating electrical energy to and from said first energy-storage means, and second translating means controlled by said timing means and coupling said output circuit to said second energy storage means for translating during at least a portion of each timing pulse of said timing means energy of said amplifier output circuit to and from said second energy-storage means; delay means coupled to said timing means to translate delayed timing pulses; means responsive to each delayed timing pulse translated by said delay means for supplying to said first translating means electrical pulse energy to be measured; means controlled by said timing means for supplying a time reference potential signal of amplitude varying with time during the interval of each timing pulse; and means included in said servo loop and controlled by the amplitude difference and sense of difference between the time reference signal potential and the energy storage potential of said second energy-storage means for periodically controlling said first translating means at a period established by said timing means and with a delay established by the potential amplitude of said second energy-storage means to effect, by time selectable translation of energy from said supply means to said first energy storage means and in relation to the energy amplitude of said reference means, measurement of a characteristic of said supplied electrical pulse energy.

9. An electrical pulse measuring system comprising: timing means; an operational amplifier having input and output circuits coupled by a servo loop including a first electrical condenser and a source of reference potential both coupled to said input circuit, a second electrical condenser, a first gate device for translating electrical energy to and from said first condenser, and a second gate device coupling said output circuit to said second condenser and controlled by said timing means to translate amplifier output-circuit energy to and from said second condenser; means controlled by said timing means for supplying to said first gate device electrical pulse energy to be measured; means controlled by said timing means for supplying a time reference potential having an amplitude varying with time; and potential pulse generating means included in said servo loop and controlled jointly by said time reference potential and by the energy storage potential of said second condenser for generating and supplying pulse-control potentials to said first gate device and effect, by time selectable translation of energy from said supply means to said first condenser and in relation to the amplitude of said first-mentioned reference potential, measurement of a characteristic of said supplied electrical pulse energy.

10. An electrical pulse measuring system comprising: a source of timing electrical pulses, a direct-current operational amplifier having input and output circuits coupled by a servo loop including a first electrical condenser and a source of unidirectional reference potential both coupled to said input circuit, a second electrical condenser, a first gate device for translating electrical energy to and from said first condenser, and a second gate device coupling said output circuit to said second condenser and controlled by each pulse of said source to translate amplifier output-circuit energy to and from said second condenser; means controlled by said timing pulses for supplying to said first gate device electrical potential pulses to be measured; a ramp generator controlled by said timing pulses for supplying a time reference potential of repetitive triangular waveform and having an amplitude varying substantially linearly with time; and potential pulse generating means included in said servo loop and controlled jointly by said time reference potential and by the energy storage potential of said second condenser for generating and supplying potential pulses to control said first gate device at a period established by said timing pulses and with a cyclic delay established by the potential of said second condenser to effect, by time selectable translation of energy from said supply means to said first condenser and in relation to the amplitude of said first-mentioned reference potential, measurement of the pulse width at preselected amplitude levels of said supplied electrical potential pulses.

11. In a pulse time measuring circuit, the combination which comprises: a source of test pulses to be measured, means coupled to said source for time sampling a test pulse to produce a sample output representative of the voltage level of said test pulse at a sample time; a reference voltage; operational amplifier means coupled to said sampling means and said reference voltage for comparing said sample output and said reference voltage and producing an error signal representative of the difference between said sample output and reference voltage; gated charge storage means coupled to said amplifier means and adapted to receive said error signal and modify its stored charge in accordance therewith; a time base generator; and voltage level coincidence pulse generating means coupled to said storage means and said generator for producing a sample pulse to said time sampling means upon sensing amplitude coincidence between said time base generator output and the charge stored in said charge storage means, said modification of said stored charge resulting in an adjustment in the time occurrence of said sample pulse to cause said time sampling means to produce a sample output nearer said reference voltage.

No references cited.

RUDOLPH V. ROLINEC, *Primary Examiner.*

P. F. WILLE, *Assistant Examiner.*